US009084077B2

(12) United States Patent
Lee et al.

(10) Patent No.: US 9,084,077 B2
(45) Date of Patent: Jul. 14, 2015

(54) METHOD AND APPARATUS FOR CONTROLLING WIRELESS PERSONAL AREA NETWORK (PAN) DEVICE

(71) Applicant: SAMSUNG ELECTRONICS CO., LTD., Suwon-si, Gyeonggi-do (KR)

(72) Inventors: Jong-woo Lee, Seongnam-si (KR); Dong-seok Kim, Seoul (KR); Sang-cheol Moon, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 259 days.

(21) Appl. No.: 13/735,251

(22) Filed: Jan. 7, 2013

(65) Prior Publication Data

US 2013/0183900 A1 Jul. 18, 2013

(30) Foreign Application Priority Data

Jan. 18, 2012 (KR) ........................ 10-2012-0005834

(51) Int. Cl.
*H04B 7/00* (2006.01)
*H04W 4/00* (2009.01)
*H04W 84/20* (2009.01)

(52) U.S. Cl.
CPC .............. *H04W 4/008* (2013.01); *H04W 84/20* (2013.01)

(58) Field of Classification Search
CPC ..... H04W 4/008; H04W 40/00; H04W 84/18; H04B 7/00
USPC .................... 455/41.2, 404.1, 41.3
See application file for complete search history.

(56) References Cited

U.S. PATENT DOCUMENTS

| 7,573,835 | B2* | 8/2009 | Sahinoglu et al. | 370/255 |
| 7,869,763 | B2* | 1/2011 | Lee et al. | 455/41.2 |
| 8,046,431 | B2* | 10/2011 | Kim et al. | 709/217 |
| 8,149,849 | B2* | 4/2012 | Osborn et al. | 370/401 |
| 8,200,155 | B2* | 6/2012 | Lee et al. | 455/41.2 |
| 8,385,323 | B2* | 2/2013 | Rudland | 370/351 |
| 8,750,197 | B2* | 6/2014 | Yang et al. | 370/315 |
| 2005/0180447 | A1* | 8/2005 | Lim et al. | 370/432 |
| 2005/0249155 | A1* | 11/2005 | Seo et al. | 370/328 |
| 2007/0030848 | A1* | 2/2007 | Miyata et al. | 370/389 |
| 2012/0026941 | A1* | 2/2012 | Ahmad et al. | 370/328 |
| 2012/0287879 | A1* | 11/2012 | Nentwig | 370/329 |
| 2013/0210353 | A1* | 8/2013 | Ling et al. | 455/41.1 |

* cited by examiner

*Primary Examiner* — Marceau Milord
(74) *Attorney, Agent, or Firm* — Staas & Halsey LLP

(57) ABSTRACT

A method of controlling a wireless personal area network (PAN) device, such that the PAN device performs at least one from among a coordinator role, a router role, and an end device role in a plurality of networks by using a single physical layer includes setting a first role corresponding to a first network and a second role corresponding to a second network; acquiring activation interval information of the first network and the second network based on the first role and the second role that are set in correspondence to the first network and the second network, respectively; performing the first role during the activation interval of the first network based on the acquired activation interval information; and switching the first role to the second role and performing the second role during the activation interval of the second network.

28 Claims, 7 Drawing Sheets

METHOD AND APPARATUS FOR CONTROLLING WIRELESS PERSONAL AREA NETWORK (PAN) DEVICE

CROSS-REFERENCE TO RELATED APPLICATIONS

This application claims priority benefit of Korean Patent Application No. 10-2012-0005834, filed on Jan. 18, 2012, in the Korean Intellectual Property Office, the disclosure of which is incorporated herein in its entirety by reference.

BACKGROUND

1. Field

One or more embodiments relate to a ZigBee personal area network (PAN), and more particularly, to a method and an apparatus for controlling a ZigBee device included in a plurality of networks to perform a plurality of ZigBee roles.

2. Description of the Related Art

ZigBee is a low-rate wireless personal area network (PAN) system, in which communications are made in three bands with different spreading methods and data rates.

ZigBee targets small, low-power, and inexpensive products and is focused as a technology for short-range communication market for home or office wireless networks ranging from 10 m to 20 m and for ubiquitous computing.

A ZigBee device for performing ZigBee communication may be included in a plurality of networks at a particular location, where roles of the ZigBee device in the plurality of networks may be different. Therefore, a solution for a ZigBee device included in a plurality of networks to efficiently perform a plurality of ZigBee roles is in demand.

SUMMARY

One or more embodiments may provide a method and an apparatus for controlling a ZigBee device, such that the ZigBee device performs a plurality of ZigBee roles in a plurality of networks by using a single physical layer.

One or more embodiments may also provide a method and an apparatus for controlling a ZigBee device, such that the ZigBee device performs a plurality of ZigBee roles in a plurality of networks without including a plurality of physical layers.

According to one or more embodiments, there is provided a method of controlling a ZigBee device, such that the ZigBee device may perform at least one from among a coordinator role, a router role, and an end device role in a plurality of networks by using a single physical layer, the method possibly including setting a first ZigBee role corresponding to a first network and a second ZigBee role corresponding to a second network; acquiring activation interval information of the first network and the second network based on the first ZigBee role and the second ZigBee role that may be set in correspondence to the first network and the second network, respectively; performing the first ZigBee role during the activation interval of the first network based on the acquired activation interval information; and switching the first ZigBee role to the second ZigBee role and performing the second ZigBee role during the activation interval of the second network.

The method may further include determining a sequence of performing the first ZigBee role and the second ZigBee role.

The determining of the sequence of performing the ZigBee roles may include setting higher priority to an end device role than to a coordinator role and a router role.

The determining of the sequence of performing the ZigBee roles may include selecting one ZigBee role from among the plurality of ZigBee roles and setting the first priority thereto; determining an activation interval start time point of a network corresponding to the ZigBee role with the first priority as a reference time point; and determining a sequence of performing roles based on differences between activation interval start time points of a plurality of networks other than the network corresponding to the ZigBee role with the first priority and the reference time point.

The determining of the sequence of performing roles based on time differences may include setting the second priority to a ZigBee role corresponding to a network in which a difference between an activation interval start time point of the network and the reference time point is the smallest.

The acquiring of the activation interval information may include, if the first ZigBee role and the second ZigBee role are an end device role or a router role, receiving the activation interval information from coordinators of the first network and the second network The acquiring of the activation interval information may include, if the first ZigBee role and the second ZigBee role are coordinator roles, setting activation interval information of the first network and the second network.

The switching of the first ZigBee role to the second ZigBee role may further include switching a first application for performing the first ZigBee role to a second application for performing the second ZigBee role.

The first ZigBee role may be an end device role and the second ZigBee role may be a coordinator role, where the method may further include adjusting an activation interval of the second network to not to overlap with an activation interval of the first network at an arbitrary time point.

The method may further include storing a function performed by the first ZigBee role during a super-frame interval included in the activation interval of the first network and a function performed by the second ZigBee role during a super-frame interval included in the activation interval of the second network; and re-performing the stored functions during next super-frame intervals of the first network and the second network.

According to another aspect of one or more embodiments, there is provided a control device for controlling a ZigBee device, such that the ZigBee device may perform at least one from among a coordinator role, a router role, and an end device role in a plurality of networks by using a single physical layer, the control device possibly including an initializer for setting a first ZigBee role corresponding to a first network and a second ZigBee role corresponding to a second network; an information acquirer for acquiring activation interval information of the first network and the second network based on the first ZigBee role and the second ZigBee role that are set in correspondence to the first network and the second network, respectively; and a controller for performing the first ZigBee role during the activation interval of the first network based on the acquired activation interval information and switching the first ZigBee role to the second ZigBee role and performing the second ZigBee role during the activation interval of the second network.

The control device may further include a scheduler for determining a sequence of performing the first ZigBee role and the second ZigBee role.

The scheduler may set higher priority to an end device role than to a coordinator role and a router role.

The scheduler may select one ZigBee role from among the plurality of ZigBee roles and sets the first priority thereto, may determine an activation interval start time point of a network corresponding to the ZigBee role with the first priority as a reference time point, and may determine a sequence of performing roles based on differences between activation interval start time points of a plurality of networks other than the network corresponding to the ZigBee role with the first priority and the reference time point.

The scheduler may set the second priority to a ZigBee role corresponding to a network in which a difference between an activation interval start time point of the network and the reference time point is the smallest.

If the first ZigBee role and the second ZigBee role are an end device role or a router role, the information acquirer may receive the activation interval information from coordinators of the first network and the second network If the first ZigBee role and the second ZigBee role are coordinator roles, the information acquirer may set activation interval information of the first network and the second network.

The controller may switch a first application for performing the first ZigBee role to a second application for performing the second ZigBee role.

The first ZigBee role may be an end device role and the second ZigBee role may be a coordinator role, where the control device may further include an adjuster for adjusting an activation interval of the second network to not to overlap with an activation interval of the first network at an arbitrary time point.

The control device may further include a stack for storing a function performed by the first ZigBee role during a super-frame interval included in the activation interval of the first network and a function performed by the second ZigBee role during a super-frame interval included in the activation interval of the second network, wherein the stored functions may be re-performed during next super-frame intervals of the first network and the second network.

According to another aspect of one or more embodiments, there is provided a computer-readable recording medium having recorded thereon a computer program for performing the method.

According to another aspect of one or more embodiments, there is provided a ZigBee device including the control device.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
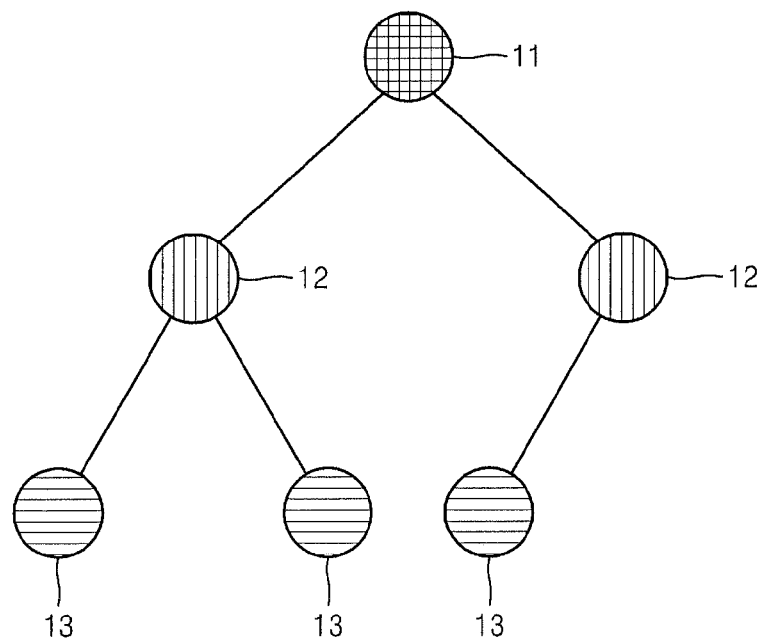
FIG. 1 illustrates a network topology of a ZigBee network.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 illustrates a network topology of a ZigBee network.

The ZigBee network is managed by a coordinator 11. A router 12 is connected to the coordinator 11 at a lower level, and an end device 13 is connected to the router 12 at a lower level.

The coordinator 11 relays data within the ZigBee network. The router 12 broadens an area of the ZigBee network and shares the roles of the coordinator 11. The end device 13 performs communication in the ZigBee network.

Figure 2:
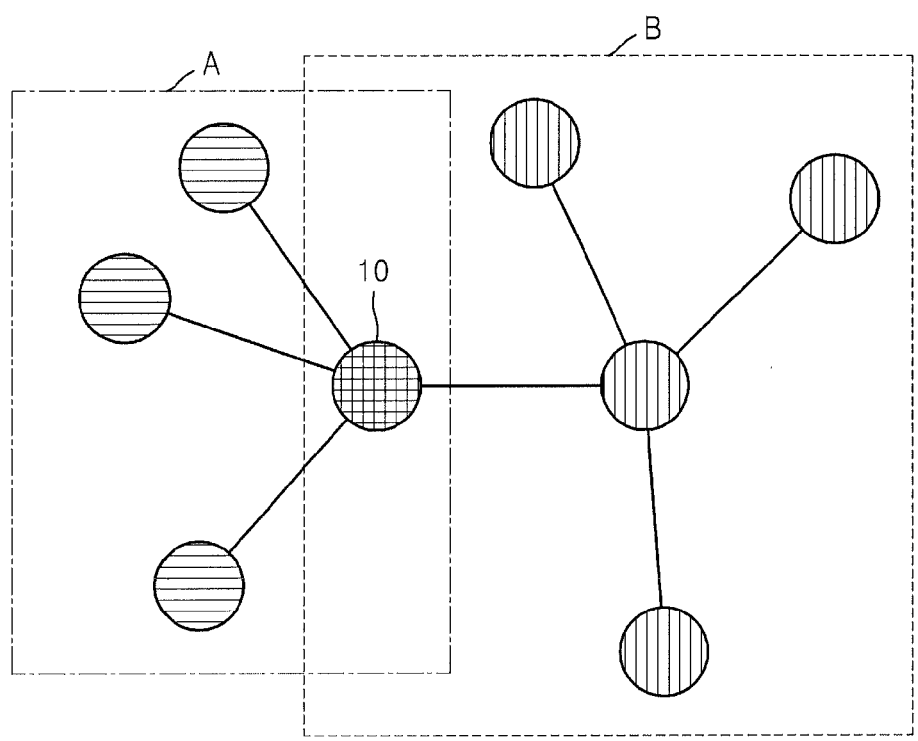
FIG. 2 shows a single ZigBee device included in a plurality of networks A and B simultaneously.

FIG. 2 shows a single ZigBee device 10 included in a plurality of networks A and B simultaneously.

As shown in FIG. 2, the single ZigBee device 10 may be included in the plurality of networks A and B simultaneously. In this case, the ZigBee device 10 may function as a coordinator in the network A and may function as an end device in the network B.

Figure 3:
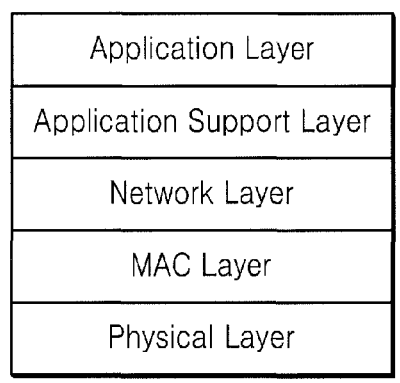
FIG. 3 is a diagram showing network layers of a ZigBee communication.

FIG. 3 is a diagram showing network layers of a ZigBee communication.

A physical layer is a layer for transmitting and receiving data wirelessly. A medium access control (MAC) layer is a layer for transmitting, receiving, and forwarding trusted data and avoiding collision, whereas a network layer is a layer regarding network joining/leaving methods, security, routing role, network initiation, etc. An application support layer is a layer for interfacing between the network layer and an application layer, and the application layer is a layer for interfacing between a user and a ZigBee system.

In a ZigBee network, a coordinator, a router, and an end device have the same physical layer. However, applications by which the coordinator, the router, and the end device function as the coordinator, the router, and the end device are different each other.

Therefore, if the ZigBee device 10 of FIG. 2 functions as a coordinator in the network A and functions as an end device in the network B, it is necessary to install two of the same hardware devices constituting a physical layer on the single ZigBee device 10 and execute an application corresponding to coordinator roles and an application corresponding to end device roles on the hardware devices, respectively. However, if the ZigBee device 10 is embodied in this way, two of the same hardware devices are installed on the single ZigBee device 10, thus requiring unnecessary cost. Therefore, a method and an apparatus for controlling a ZigBee device according to one or more embodiments enable the ZigBee device to perform a plurality of roles by using a single physical layer for cost reduction.

Figure 4:
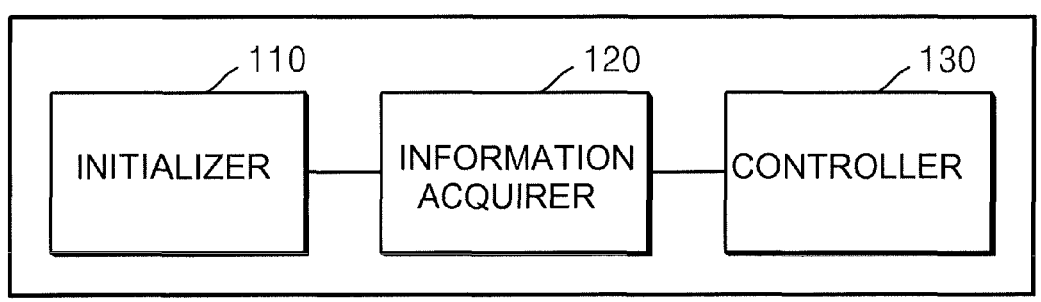
FIG. 4 is a block diagram showing a configuration of a control device according to one or more embodiments.

FIG. 4 is a block diagram showing a configuration of a control device 100 according to one or more embodiments.

Referring to FIG. 4, the control device 100 according to the present embodiment may include an initializer 110, an information acquirer 120, and a controller 130. The control device 100 according to the present embodiment may be included in a ZigBee device or embodied as a microchip.

The initializer 110 may set up a first ZigBee role and a second ZigBee role respectively corresponding to a first network and a second network from among a plurality of networks including the ZigBee device.

Each of the first ZigBee role and the second ZigBee role may be at least one of a coordinator role, a router role, and an end device role.

Furthermore, the initializer 110 may set information regarding ZigBee role to be performed by the ZigBee device in each network. A detailed description thereof is given below with reference to FIG. 7.

The information acquirer 120 may acquire activation interval information regarding the first network and the second network based on the first ZigBee role and the second ZigBee role that may respectively be set in correspondence to the first network and the second network.

Here, an activation interval is an interval including a beacon broadcast by a coordinator of a corresponding network and a super-frame interval. In a ZigBee network, a coordinator periodically broadcasts beacons, and, in super-frame intervals following beacons, ZigBee devices exchange data with each other. An interval between the end of an activation interval and the beginning of a next activation interval is a deactivation interval. In a deactivation interval, ZigBee devices are switched to a sleep mode to reduce power consumption.

Activation interval information may include a duration and period of activation intervals, each of which includes a beacon and a super-frame interval. The information acquirer 120 may determine an activation interval start time point in each network with reference to activation interval information of the first network and the second network.

The activation interval information may be indirectly obtained based on a period of beacons, a duration of a super-frame interval, or a duration of a deactivation interval. In this case, the activation interval may be obtained by subtracting the duration of the deactivation interval from the period of beacons.

If the first ZigBee role and the second ZigBee role are end device roles or router roles, the information acquirer 120 may receive activation interval information from coordinators of the first network and the second network. The activation interval information may be included in beacons broadcast by the coordinators of the first network and the second network.

Furthermore, if the first ZigBee role and the second ZigBee role are coordinator roles, the information acquirer 120 may set activation interval information of the first network and the second network, because a coordinator of a network may determine its own activation interval information.

The controller 130 may control a ZigBee device to perform the first ZigBee role during an activation interval of the first network and may switch the first ZigBee role to the second ZigBee role, such that the ZigBee device may perform the second ZigBee role during an activation interval of the second network.

In detail, the controller 130 may switch the first ZigBee role to the second ZigBee role by switching a first application for performing the first ZigBee role to a second application for performing the second ZigBee role. For example, if the first ZigBee role is a coordinator role and the second ZigBee role is an end device role, the controller 130 may switch an application for performing a coordinator role to an application for performing an end device role. If ZigBee role information is set by the initializer 110, the controller 130 may change ZigBee role information regarding each of the ZigBee roles when the first ZigBee role is switched to the second ZigBee role.

Figure 5:
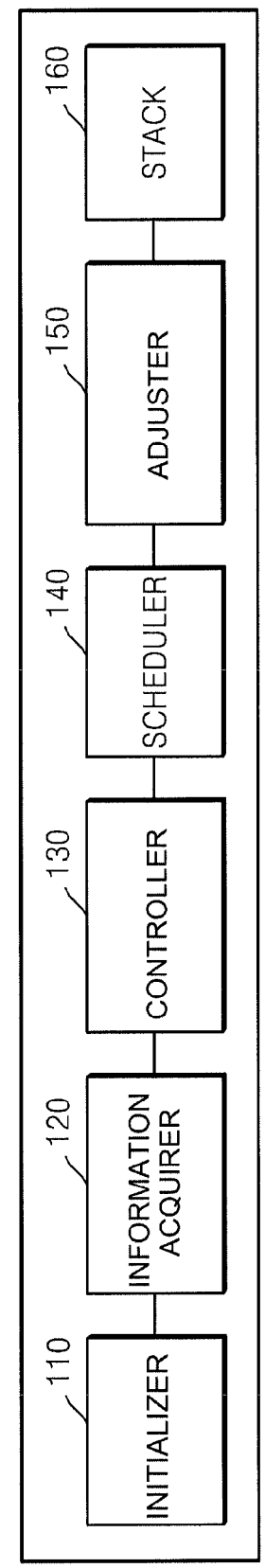
FIG. 5 is a block diagram showing a configuration of a control device according to one or more embodiments.

FIG. 5 is a block diagram showing a configuration of a control device 200 according to one or more embodiments.

Referring to FIG. 5, the control device 200 according to the present embodiment may further include a scheduler 140, an adjuster 150, or a stack 160.

The initializer 110, the information acquirer 120, and the controller 130 shown in FIG. 5 are identical to those described above with reference to FIG. 4, and thus detailed descriptions thereof are omitted.

The scheduler 140 may determine a sequence of performing the first ZigBee role and the second ZigBee role. In other words, the scheduler 140 may determine which of the first ZigBee role and the second ZigBee role is to be performed first.

If the first ZigBee role or the second ZigBee role is an end device role, the scheduler 140 may set the priority to the end device role, because an end device is unable to adjust an activation interval in a network in which the end device is included. In other words, if higher priority is set to an end device role and lower priority is set to a coordinator role, the coordinator role may adjust an activation interval of a network in which the coordinator role is included to not to overlap with an activation interval of a network in which the end device role is included.

Furthermore, the scheduler 140 may select an arbitrary ZigBee role from among a plurality of ZigBee roles, set the first priority thereto, and determine an activation interval start time point of a network corresponding to the ZigBee role with the first priority as a reference time point. Next, a sequence of performing roles may be determined based on differences between activation interval start time points of a plurality of networks other than the network corresponding to the ZigBee role with the first priority and the reference time point. Here, the second priority may be set to a ZigBee role corresponding to a network in which a difference between an activation interval start time point of the network and the reference time point is the smallest. A detailed description thereof is given below with reference to FIGS. 6A-6C.

Figure 6:
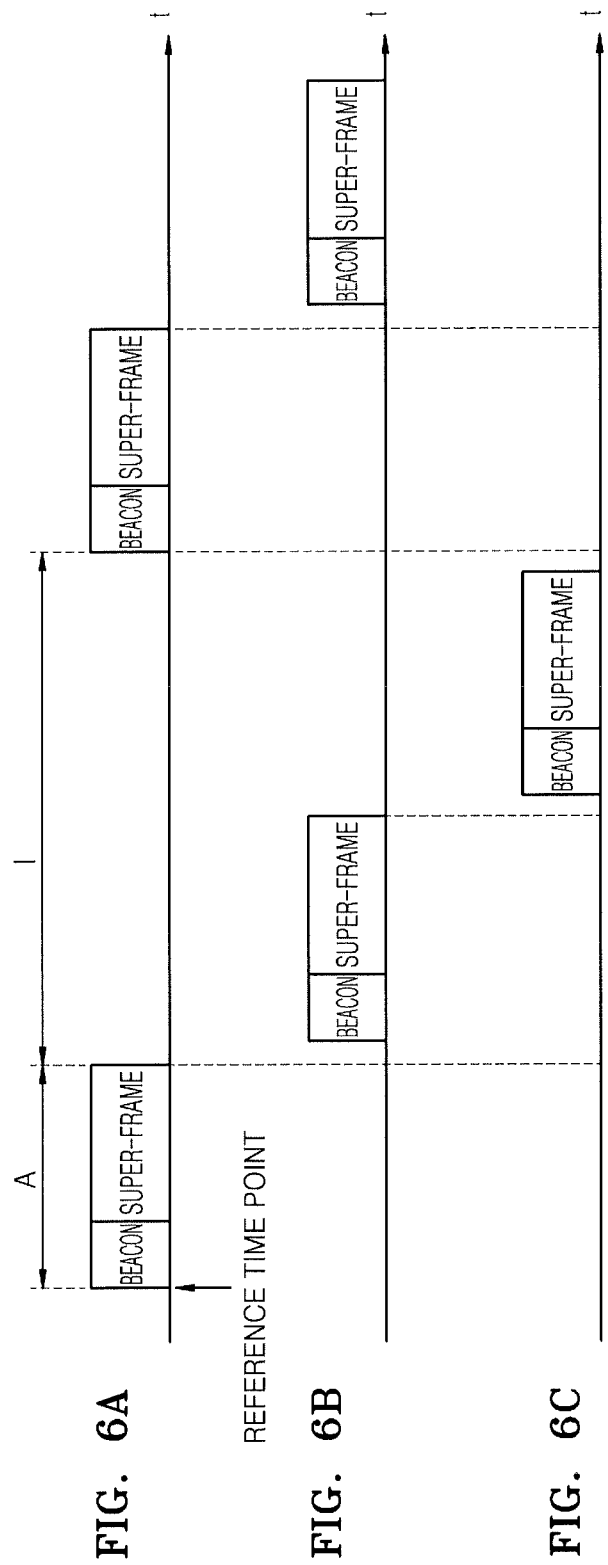
FIGS. 6A-6C are diagrams showing broadcasting schedules of networks according to one or more embodiments.

FIGS. 6A-6C are diagrams showing broadcasting schedules of networks according to one or more embodiments.

FIG. 6(a) shows a broadcasting schedule of a first network, FIG. 6(b) shows a broadcasting schedule of a second network, and FIG. 6(c) shows a broadcasting schedule of a third network.

In each of the broadcasting schedules, an activation interval A includes a beacon and a super-frame interval, and a deactivation interval I is a duration obtained by subtracting the activation interval from period of beacons.

Because the second ZigBee role performed in the second network cannot be simultaneously performed with the first ZigBee role performed in the first network, the activation intervals A of the networks should not overlap with each other at arbitrary time points. In other words, the second ZigBee role is performed during the deactivation interval I of the first network.

In the broadcasting schedule of the first network shown in FIG. 6(a), if a beacon broadcast start time point, that is, an activation interval start time point, is determined as a reference time point, the second priority will be set to a second ZigBee role and the third priority will be set to a third ZigBee role based on differences between activation time interval start time points of the second network and the third network and the reference time point. If the priorities of the second ZigBee role and the third ZigBee role are reversed, an application for performing the second ZigBee role is not executed on a ZigBee device during the activation interval of the second network, and thus the ZigBee device cannot perform the second ZigBee role.

As shown in FIG. 5, a control device according to one or more embodiments may further include the adjuster 150.

If the first ZigBee role is an end device role and the second ZigBee role is a coordinator role, the adjuster 150 may adjust an activation interval of the second network, such that the activation interval of the second network does not overlap with the activation interval of the first network at an arbitrary time point, because a single ZigBee device cannot simultaneously perform the first ZigBee role and the second ZigBee role in the first network and the second network, respectively.

Furthermore, a control device according to one or more embodiments may further include the stack 160.

The stack 160 may store a function performed by the first ZigBee role during a super-frame interval included in the activation interval of the first network and a function performed by the second ZigBee role during a super-frame interval included in the activation interval of the second network. The functions stored in the stack 160 may be re-performed during next super-frame intervals.

The functions performed by the first ZigBee role and the second ZigBee role are functions unique to respective ZigBee devices and may include a temperature measuring function, a speaker function, etc.

If the first ZigBee role performed during the super-frame interval of the first network is a temperature measuring function and the second ZigBee role performed during the super-frame interval of the second network is a speaker function, when switching from the first ZigBee role to the second ZigBee role, it may be necessary to store a previously performed function because it may be necessary to re-perform the temperature measuring function when switching back from the second ZigBee role to the first ZigBee role.

Figure 7:
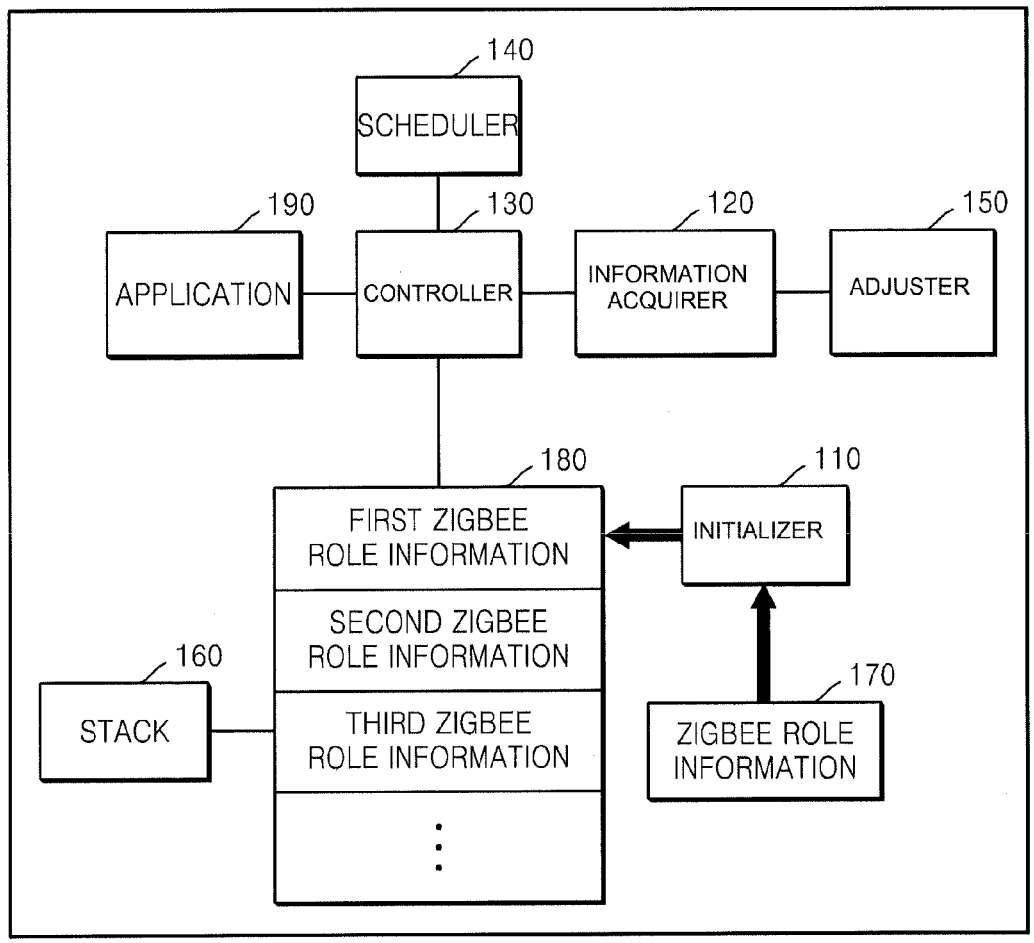
FIG. 7 is a diagram showing a configuration of a control device according to one or more embodiments.

FIG. 7 is a diagram showing a configuration of a control device 300 according to one or more embodiments.

Figure 8:
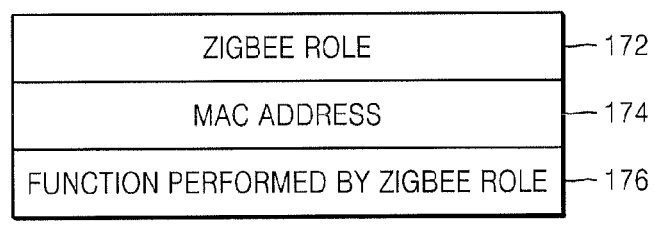
FIG. 8 is a diagram showing ZigBee role information in a control device according to one or more embodiments.

A user may input information regarding a ZigBee role to be performed by a ZigBee device to the initializer 110. FIG. 8 is a diagram showing ZigBee role information in control device according to one or more embodiments. Referring to FIG. 8, the ZigBee role information 170 may include a ZigBee role 172, a MAC address 174, and a function performed by the ZigBee role 176. A user may input only the ZigBee role 172 and the function performed by the ZigBee role 176 to the initializer 110, and the initializer 110 may set the MAC address 174 corresponding to each of the ZigBee roles. Furthermore, the ZigBee role information 170 may further include identifiers (not shown) of networks respectively corresponding to ZigBee roles. Therefore, a network including a particular ZigBee role may be specified.

The initializer 110 may store the input ZigBee role information 170 in a queue 180. A plurality pieces of ZigBee role information may be sequentially stored in the queue 180. The controller 130 may refer to activation interval information of networks acquired by the information acquirer 120 and may switch ZigBee role information included in the queue 180 and an application 190, such that ZigBee roles are respectively performed in correspondence to networks. Accordingly, a ZigBee role to be performed by a ZigBee device may be switched.

Figure 9:
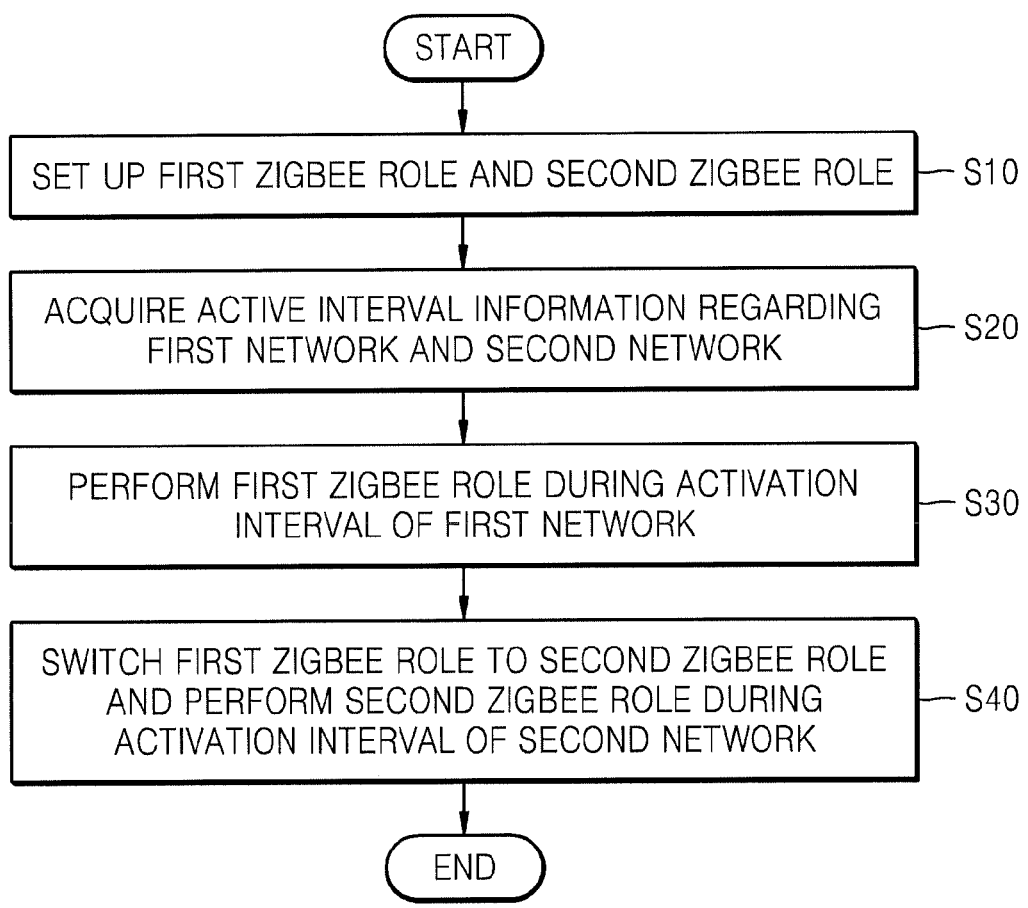
FIG. 9 is a flowchart showing a method of controlling a ZigBee device, according to one or more embodiments.

FIG. 9 is a flowchart showing a method of controlling a ZigBee device, according to one or more embodiments. Referring to FIG. 9, the method of controlling a ZigBee device, according to the present embodiment, may include operations that are chronologically performed by the control devices 100 and 200 shown in FIGS. 4 and 5. Therefore, even if not described below, descriptions given above with respect to the control devices 100 and 200 shown in FIGS. 4 and 5 may also be applied to the method of controlling a ZigBee device shown in FIG. 9.

In operation S10, the initializer 110 may set up a first ZigBee role corresponding to a first network and a second ZigBee role corresponding to a second network. A user may input a ZigBee role 172 and a function performed by the ZigBee role 176 to the initializer 110, and the initializer 110 may set a MAC address 174 and network identifier.

In operation S20, the information acquirer 120 may acquire active interval information regarding the first network and the second network based on the first ZigBee role and the second ZigBee role that are set in correspondence to the first network and the second network, respectively. The activation interval information may include a period of activation intervals and a duration of an activation interval.

If the first ZigBee role and the second ZigBee role are an end device role or a router role, the information acquirer 120 may receive the activation interval information from coordinators of the first network and the second network. The activation interval information may be included in beacons broadcast by the coordinators of the first network and the second network.

Furthermore, if the first ZigBee role and the second ZigBee role are coordinator roles, the information acquirer 120 may set activation interval information of the first network and the second network, because a coordinator of a network may determine its own activation interval information.

In operation S30, the controller 130 may control a ZigBee device to perform the first ZigBee role during an activation interval of the first network.

In operation S40, the controller 130 may switch the first ZigBee role to the second ZigBee role, such that the ZigBee device performs the second ZigBee role during an activation interval of the second network.

The controller 130 may switch the first ZigBee role to the second ZigBee role by switching a first application for performing the first ZigBee role to a second application for performing the second ZigBee role.

A method of performing a plurality of ZigBee roles, according to an one or more embodiments, may further include determining a sequence of performing the first ZigBee role and the second ZigBee role. In this case, higher priority may be set to an end device role than a coordinator role and a router role.

Figure 10:
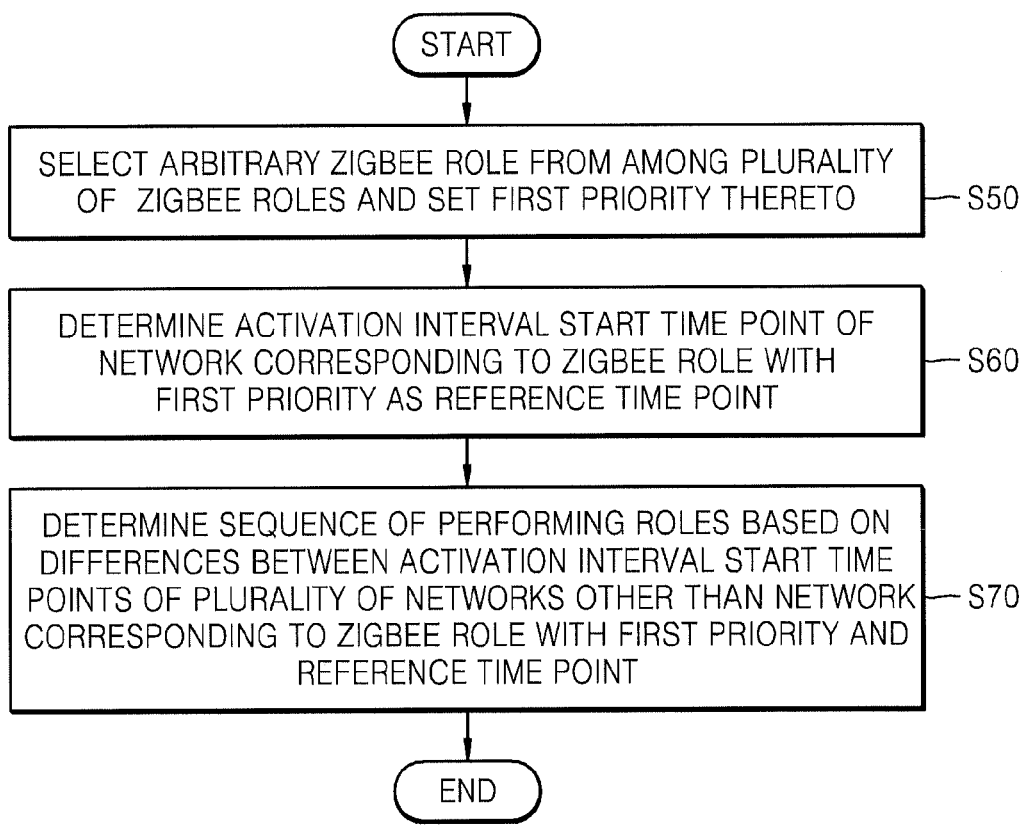
FIG. 10 is a flowchart showing a method of determining a sequence of performing a plurality of ZigBee roles according to one or more embodiments.

FIG. 10 is a flowchart showing a method of determining a sequence of performing a plurality of ZigBee roles according to one or more embodiments.

Referring to FIG. 10, in operation S50, the scheduler 140 may select an arbitrary ZigBee role from among the plurality of ZigBee roles and set the first priority thereto.

In operation S60, the scheduler 140 may determine an activation interval start time point of a network corresponding to the ZigBee role with the first priority as a reference time point.

In operation S70, the scheduler 140 may determine a sequence of performing roles based on differences between activation interval start time points of a plurality of networks other than the network corresponding to the ZigBee role with the first priority and the reference time point.

The scheduler 140 may set the second priority to a ZigBee role corresponding to a network in which a difference between an activation interval start time point of the network and the reference time point is the smallest.

According to a method and an apparatus for controlling a ZigBee device, according to one or more embodiments, described above, a single ZigBee device may be controlled to perform a plurality of ZigBee roles respectively in a plurality of networks by using a single physical layer of the ZigBee device.

Furthermore, a method and an apparatus for controlling a ZigBee device, according to one or more embodiments, described above, a single ZigBee device may perform a plurality of ZigBee roles respectively in a plurality of networks without having a plurality of physical layers.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A method of controlling a wireless personal area network (PAN) device, such that the PAN device performs at least one from among a coordinator role, a router role, and an end device role in a plurality of networks by using a single physical layer, the method comprising:

setting a first role among the coordinator role, the router role, and the end device role, the first being corresponding to a first network among the plurality of networks, and a second role among the coordinator role, the router role, and the end device role, the second role being corresponding to a second network among the plurality of networks;

acquiring activation interval information of the first network and the second network based on the first role and the second role;

performing the first role during the activation interval of the first network; and switching the first role to the second role and performing the second role during the activation interval of the second network.

2. The method of claim 1, further comprising determining a sequence of performing the first role and the second role.

3. The method of claim 2, wherein the determining of the sequence of performing the roles comprises setting higher priority to an end device role than to a coordinator role and a router role.

4. The method of claim 2, wherein the determining of the sequence of performing the roles comprises:

selecting one role from among the plurality of roles and setting the first priority thereto;

determining an activation interval start time point of a network corresponding to the role with the first priority as a reference time point; and determining a sequence of performing roles based on differences between activation interval start time points of a plurality of networks other than the network corresponding to the role with the first priority and the reference time point.

5. The method of claim 4, wherein the determining the sequence of performing roles based on time differences comprises setting the second priority to a role corresponding to a network in which a difference between an activation interval start time point of the network and the reference time point is the smallest.

6. The method of claim 1, wherein the acquiring of the activation interval information comprises receiving the activation interval information from coordinators of the first network and the second network when the first role and the second role are an end device role or a router role.

7. The method of claim 1, wherein the acquiring of the activation interval information comprises setting activation interval information of the first network and the second network when the first role and the second role are coordinator roles.

8. The method of claim 1, wherein the switching of the first role to the second role further comprises switching a first application for performing the first role to a second application for performing the second role.

9. The method of claim 1, wherein the first role is an end device role and the second role is a coordinator role,
further comprising adjusting an activation interval of the second network to not to overlap with an activation interval of the first network at an arbitrary time point.

10. The method of claim 1, further comprising:
storing a function performed by the first role during a super-frame interval included in the activation interval of the first network and a function performed by the second role during a super-frame interval included in the activation interval of the second network; and
re-performing the stored functions during next super-frame intervals of the first network and the second network.

11. A non-transitory computer-readable recording medium having recorded thereon a computer program for performing the method of claim 1.

12. The method of claim 1, wherein the PAN device is a ZigBee device.

13. A control device for controlling a wireless personal area network (PAN) device, such that the PAN device performs at least one from among a coordinator role, a router role, and an end device role in a plurality of networks by using a single physical layer, the control device comprising:
an initializer for setting a first role among the coordinator role, the router role, and the end device role, the first role being corresponding to a first network, and a second role among the coordinator role, the router role, and the end device role, the second role being corresponding to a second network;
an information acquirer for acquiring activation interval information of the first network and the second network based on the first role and the second role; and
a controller for performing the first role during the activation interval of the first network and switching the first role to the second role and performing the second role during the activation interval of the second network.

14. The control device of claim 13, further comprising a scheduler for determining a sequence of performing the first role and the second role.

15. The control device of claim 14, wherein the scheduler sets higher priority to an end device role than a coordinator role and a router role.

16. The control device of claim 14, wherein the scheduler selects one role from among the plurality of roles and sets the first priority thereto, determines an activation interval start time point of a network corresponding to the role with the first priority as a reference time point, and determines a sequence of performing roles based on differences between activation interval start time points of a plurality of networks other than the network corresponding to the role with the first priority and the reference time point.

17. The control device of claim 16, wherein the scheduler sets the second priority to a role corresponding to a network in which a difference between an activation interval start time point of the network and the reference time point is the smallest.

18. The control device of claim 13, wherein the information acquirer receives the activation interval information from coordinators of the first network and the second network when the first role and the second role are an end device role or a router role.

19. The control device of claim 13, wherein the information acquirer sets activation interval information of the first network and the second network when the first role and the second role are coordinator roles.

20. The control device of claim 13, wherein the controller switches a first application for performing the first role to a second application for performing the second role.

21. The control device of claim 13 further comprising an adjuster for adjusting an activation interval of the second network to not to overlap with an activation interval of the first network at an arbitrary time point when the first role is an end device role and the second role is a coordinator role.

22. The control device of claim 13, further comprising a stack for storing a function performed by the first role during a super-frame interval included in the activation interval of the first network and a function performed by the second role during a super-frame interval included in the activation interval of the second network,
wherein the stored functions are re-performed during next super-frame intervals of the first network and the second network.

23. The control device of claim 13, wherein the PAN device comprises the control device.

24. The control device of claim 13, wherein the initializer receives role information as input from a user and stores the input role information in a queue.

25. A control device for controlling a wireless personal area network (PAN) device, such that the PAN device performs at least one from among a coordinator role, a router role, and an end device role in a plurality of networks by using a single physical layer, the control device comprising:
an initializer for setting a first role among a coordinator role, a router role, and an end device role, the first role being corresponding to a first network, and a second role among the coordinator role, the router role, and the end device role, the second role being corresponding to a second network;
an information acquirer for acquiring activation interval information of the first network and the second network; and
an adjuster for adjusting an activation interval of the second network to not to overlap with an activation interval of the first network at an arbitrary time point when the first role is an end device role and the second role is a coordinator role.

26. The control device of claim 25, wherein the information acquirer receives the activation interval information from coordinators of the first network and the second network when the first role and the second role are an end device role or a router role.

27. The control device of claim 25, wherein the information acquirer sets activation interval information of the first network and the second network when the first role and the second role are coordinator roles.

28. The control device of claim 25, the PAN device comprises the control device.

* * * * *